US010767291B2

(12) United States Patent
Wilson

(10) Patent No.: US 10,767,291 B2
(45) Date of Patent: Sep. 8, 2020

(54) TEXTILE PRODUCT FABRICATION AND RENDERING

(71) Applicant: GOOGLE LLC, Mountian View, CA (US)

(72) Inventor: Timothy Edward Wilson, Burlingame, MA (US)

(73) Assignee: Google LLC, Mountain View, CA (US)

( * ) Notice: Subject to any disclaimer, the term of this patent is extended or adjusted under 35 U.S.C. 154(b) by 72 days.

(21) Appl. No.: 15/958,896

(22) Filed: Apr. 20, 2018

(65) Prior Publication Data
US 2019/0323157 A1 Oct. 24, 2019

(51) Int. Cl.
D05B 19/08 (2006.01)
G05B 19/408 (2006.01)
D05B 19/10 (2006.01)

(52) U.S. Cl.
CPC ............ D05B 19/08 (2013.01); D05B 19/10 (2013.01); G05B 19/408 (2013.01); D05D 2205/02 (2013.01); D05D 2205/16 (2013.01); G05B 2219/45196 (2013.01)

(58) Field of Classification Search
None
See application file for complete search history.

(56) References Cited

U.S. PATENT DOCUMENTS

| 6,397,120 B1* | 5/2002 | Goldman | D05B 19/08 112/102.5 |
| 8,515,999 B2* | 8/2013 | de Cerqueira Gatti | G06F 16/88 707/791 |
| 2002/0130869 A1* | 9/2002 | Camiener | G06F 17/50 345/440 |
| 2004/0138970 A1* | 7/2004 | Ramachandran | H04L 12/14 705/34 |
| 2006/0027151 A1* | 2/2006 | Kaiya | D05B 19/10 112/153 |
| 2014/0223583 A1* | 8/2014 | Wegner | G06F 17/50 726/33 |

(Continued)

OTHER PUBLICATIONS

Autodesk, Integration of Textiles in Fusion 360, Autodesk Knowledge Network, Jan. 21, 2017. retrieved from http://au.autodesk.com/content/au/global/en/au-online/classes-on-demand/class-catalog/classes/year-2016/fusion-360/pd20822/jcr.content on Sep. 27, 2019 (Year: 2017).*

(Continued)

Primary Examiner — Mohammad Ali
Assistant Examiner — Joshua T Sanders
(74) Attorney, Agent, or Firm — Dority & Manning, PA

(57) ABSTRACT

Preparing textile products by establishing, by a textile product system, data types, valid values for each data type, and valid relationships between the data types encompassing specification of textile products for manufacturing and visualization of the textile products. Receiving, from a user, a first data set comprising values of data types and relationships between the data types associated with at least one of manufacturing of a particular textile product and visualization of the particular textile product. Determining whether the received first data set conforms to the data type, data value, and data relationships valid for at least one of the manufacturing of textile products and the visualization of textile products.

15 Claims, 7 Drawing Sheets

(56) References Cited

U.S. PATENT DOCUMENTS

2018/0239660 A1* 8/2018 Guha ................. G06F 11/0709

OTHER PUBLICATIONS

Autodesk, Post processor selection, Autodesk Knowledge Network, Nov. 27, 2017. retrieved from http://help.autodesk.com/cloudhelp/2018/ENU/Inventor-HSM/files/GUID-F39A96DF-FC48-4A9D-94A5-2C6FB4C91253.htm on Sep. 27, 2019 (Year: 2017).*
Wikipedia, Computer-aided manufacturing, revision Mar. 26, 2018, Wikimedia foundation, retrieved from http://en.wikipedia.org/w/index.php?title=Computer-aided_manufacturing&oldid=832486810 on Sep. 27, 2019 (Year: 2018).*
Wikipedia, Type System, revision Jan. 31, 2018, Wikimedia foundation, retrieved from http://en.wikipedia.org/w/index.php?title=Type_system&oldid=823283213 (Year: 2018).*

* cited by examiner

200

```
┌─────────────────────────────────────────────────────────────────────┐
│ Establish data types, valid values for each data type, and valid    │
│ relationships between the data types encompassing specification of  │
│ textile products for manufacturing and visualization of the textile │
│ products                                                            │
│                              210                                    │
└─────────────────────────────────────────────────────────────────────┘
                                  ↓
┌─────────────────────────────────────────────────────────────────────┐
│ Receive, from a user, a first data set comprising values of data    │
│ types and relationships between the data types associated with at   │
│ least one of manufacturing and visualization of the particular      │
│ textile product                                                     │
│                              220                                    │
└─────────────────────────────────────────────────────────────────────┘
                                  ↓
┌─────────────────────────────────────────────────────────────────────┐
│ Determine whether the received first data set conforms to the data  │
│ type, data value, and data relationships valid for at least one of  │
│ the manufacturing of textile products and the visualization of      │
│ textile products                                                    │
│                              230                                    │
└─────────────────────────────────────────────────────────────────────┘
```

```
┌─────────────────────────────────────────────────────────────────────┐
│ Establish data types, valid values for each data type, and valid    │
│ relationships between the data types encompassing specification of  │
│ textile products for manufacturing and visualization of the textile │
│ products                                                            │
│ 310                                                                 │
└─────────────────────────────────────────────────────────────────────┘
                                    │
                                    ▼
┌─────────────────────────────────────────────────────────────────────┐
│ Receive, from a user, a first data set comprising values of data    │
│ types and relationships between the data types associated with at   │
│ least one of manufacturing and visualization of the particular      │
│ textile product                                                     │
│ 320                                                                 │
└─────────────────────────────────────────────────────────────────────┘
                                    │
                                    ▼
┌─────────────────────────────────────────────────────────────────────┐
│ Determine whether the received first data set conforms to the data  │
│ type, data value, and data relationships valid for at least one of  │
│ the manufacturing of textile products and the visualization of      │
│ textile products                                                    │
│ 330                                                                 │
└─────────────────────────────────────────────────────────────────────┘
                                    │
                                    ▼
┌─────────────────────────────────────────────────────────────────────┐
│ Request additional or revised data and relationships between data   │
│ types in response to the determining that the received first data   │
│ set does not conform                                                │
│ 440                                                                 │
└─────────────────────────────────────────────────────────────────────┘
```

Establish data types, valid values for each data type, and valid relationships between the data types encompassing specification of textile products for manufacturing and visualization of the textile products
310

---

Receive, from a user, a first data set comprising values of data types and relationships between the data types associated with at least one of manufacturing and visualization of the particular textile product
320

---

Determine whether the received first data set conforms to the data type, data value, and data relationships valid for at least one of the manufacturing of textile products and the visualization of textile products
330

---

Receive, from the user, a identifier of a manufacturing system as a destination for a specification describing the particular textile product
540

---

Prepare, by a manufacturing system driver, instructions specific to the identified manufacturing system based on the received first data set
550

---

Transmit the prepared instructions to the identified manufacturing system
560

```
┌─────────────────────────────────────────────────────────────────────┐
│ Establish data types, valid values for each data type, and valid    │
│ relationships between the data types encompassing specification of  │
│ textile products for manufacturing and visualization of the textile │
│ products                                                            │
│ 310                                                                 │
└─────────────────────────────────────────────────────────────────────┘
                                    ↓
┌─────────────────────────────────────────────────────────────────────┐
│ Receive, from a user, a first data set comprising values of data    │
│ types and relationships between the data types associated with at   │
│ least one of manufacturing and visualization of the particular      │
│ textile product                                                     │
│ 320                                                                 │
└─────────────────────────────────────────────────────────────────────┘
                                    ↓
┌─────────────────────────────────────────────────────────────────────┐
│ Determine whether the received first data set conforms to the data  │
│ type, data value, and data relationships valid for at least one of  │
│ the manufacturing of textile products and the visualization of      │
│ textile products                                                    │
│ 330                                                                 │
└─────────────────────────────────────────────────────────────────────┘
                                    ↓
┌─────────────────────────────────────────────────────────────────────┐
│ Receive, from the user, a identifier of a visualization system as a │
│ destination for a specification describing the particular textile   │
│ product                                                             │
│ 640                                                                 │
└─────────────────────────────────────────────────────────────────────┘
                                    ↓
┌─────────────────────────────────────────────────────────────────────┐
│ Prepare, by a visualization system driver, instructions specific to │
│ the identified visualization system based on the received first     │
│ data set                                                            │
│ 650                                                                 │
└─────────────────────────────────────────────────────────────────────┘
                                    ↓
┌─────────────────────────────────────────────────────────────────────┐
│ Transmit the prepared instructions to the identified visualization  │
│ system                                                              │
│ 660                                                                 │
└─────────────────────────────────────────────────────────────────────┘
```

TEXTILE PRODUCT FABRICATION AND RENDERING

TECHNICAL FIELD

The technology disclosed herein is related to fabrication and rendering of textile products. Particular examples relate to the use of a common specification and modeling method applicable to both fabrication and rendering via simulation.

BACKGROUND

Textile products run the gamut from clothing, to containers (such as bags and baskets), to household products (such as carpeting, upholstered furnishings, window shades, towels, coverings for tables, beds, and other flat surfaces). Textiles are used in products such as filtering, flags, backpacks, tents, nets, handkerchiefs, and cleaning rags. Even products such as balloons, kites, sails, and parachutes are made with textiles. Textiles can be used to provide strengthening in composite materials such as fiberglass. Textiles are used in many traditional crafts such as sewing, quilting, and embroidery. Technical textiles include textile products for automotive applications, medical textile products (e.g. implants), geotextile products (reinforcement of embankments), agro-textiles (textiles for crop protection), protective clothing (for example, against heat and radiation for fire fighter clothing, against molten metals for welders, stab protection, and bullet proof vests).

Standards, such as ASTM D6673-10 "Standard Practice for Sewn Products Pattern Data Interchange-Data Format," exist to facilitate two-dimensional, sewn pattern piece data exchange between computer-aided design (CAD) systems at the level of pattern design. ASTM D6673-10 also facilitates grade rule table (used to create dimensions for various sizes of the same pattern) data exchange for sewn products in the apparel industry. ASTM D6673-10 uses the "DXF" file format for pattern piece data exchange, and a specially formatted ASCII file format for grade rule tables. It is limited to the transfer of pattern pieces within a style and the associated pattern piece and style information. It does not support the transfer of numerical cutter instructions, plotter instructions, complete marker-laying or spreading information, or product data specification information.

SUMMARY

The technology described herein includes computer implemented methods, computer program products, and systems to prepare textile products. In some examples, one or more computing devices of a textile product system establishes data types, valid values for each data type, and valid relationships between the data types encompassing specification of textile products for manufacturing and visualization of the textile products. The textile product system receives, from a user, a first data set comprising values of data types and relationships between the data types associated with at least one of manufacturing of a particular textile product and visualization of the particular textile product. The textile product system determines whether the received first data set conforms to the data type, data value, and data relationships valid for at least one of the manufacturing of textile products and the visualization of textile products.

In some embodiments, determining indicates that the received first data set does not conform to at least the data types, valid data type values, and valid relationships between data types established for at least one of the manufacturing and the visualization of textile products. In such embodiments, the textile product system requests at least one of additional and revised data and relationships between data types in response to the determining that the received first data set does not conform to at least the data types, valid data type values, and valid relationships between data types established for at least one of the manufacturing and the visualization of textile products.

In some embodiments, the textile product system receives, from the user, an identifier of a manufacturing system as a destination for a specification describing the particular textile product. In such embodiments, a manufacturing system driver of the textile product system prepares instructions specific to the identified manufacturing system based on the received first data set. In such embodiments, the textile product system transmits the prepared instructions to the identified manufacturing system.

In some embodiments, the textile product system receives, from the user, an identifier of a visualization system as a destination for a specification describing the particular textile product. In such embodiments, a visualization system driver of the textile product system prepares instructions specific to the identified manufacturing system based on the received first data set. In such embodiments, the textile product system transmits the prepared instructions to the identified visualization system.

These and other aspects, objects, features, and advantages of the technology described herein will become apparent to those having ordinary skill in the art upon consideration of the following detailed description of illustrated examples.

BRIEF DESCRIPTION OF THE DRAWINGS

FIG. 2 is a block diagram illustrating methods to prepare textile products, in accordance with certain examples.

FIG. 4 is a block diagram illustrating methods to prepare textile products, in accordance with certain examples.

FIG. 5 is a block diagram illustrating methods to prepare textile products, in accordance with certain examples.

FIG. 6 is a block diagram illustrating methods to prepare textile products, in accordance with certain examples.

DETAILED DESCRIPTION OF THE EXAMPLES

A comprehensive approach that fully describes all components, parts, and steps to construct/visualize a garment or other textile product in an organized machine-readable format is not known. Existing approaches to textile product specification are missing at least one of button placement and style, zipper placement and type, rivets type and placement, seam location, seam thread color, stitch type/spacing, textile choices, fold location for hems, logo placement, textile panel cut lines, internal sew lines, and panel to panel (seam) connectivity. Such data is required to construct a complete virtual garment or other textile product. Today, even if both computer-aided design and computer-aided manufacturing (CAD/CAM) are used, the output generated is piecemeal. The garment industry is still very labor intensive.

The combination of sporadic, generalized, mixed, and often poorly-focused inputs, the requirement for highly-specific product descriptions required as inputs by online shopping services, and the unavailability of non-electronic methods to reconcile the differences between such inputs, creates unaddressed problems unique to electronic commerce.

By using and relying on the methods and systems described herein, the technology disclosed herein can provide a single source for specifying textile products, regardless of whether the destination is a specific set of one or more textile product manufacturing systems or textile product visualization systems. As such, the technology may be employed to create an isolation layer between specification of textile products (which should be stable over time) and destination-specific uses of the specification (for example, manufacturing or visualization, which likely change).

Turning now to the drawings, in which like numerals represent like (but not necessarily identical) elements throughout the figures, examples of the present technology are described in detail.

Example System Architectures

Figure 1:
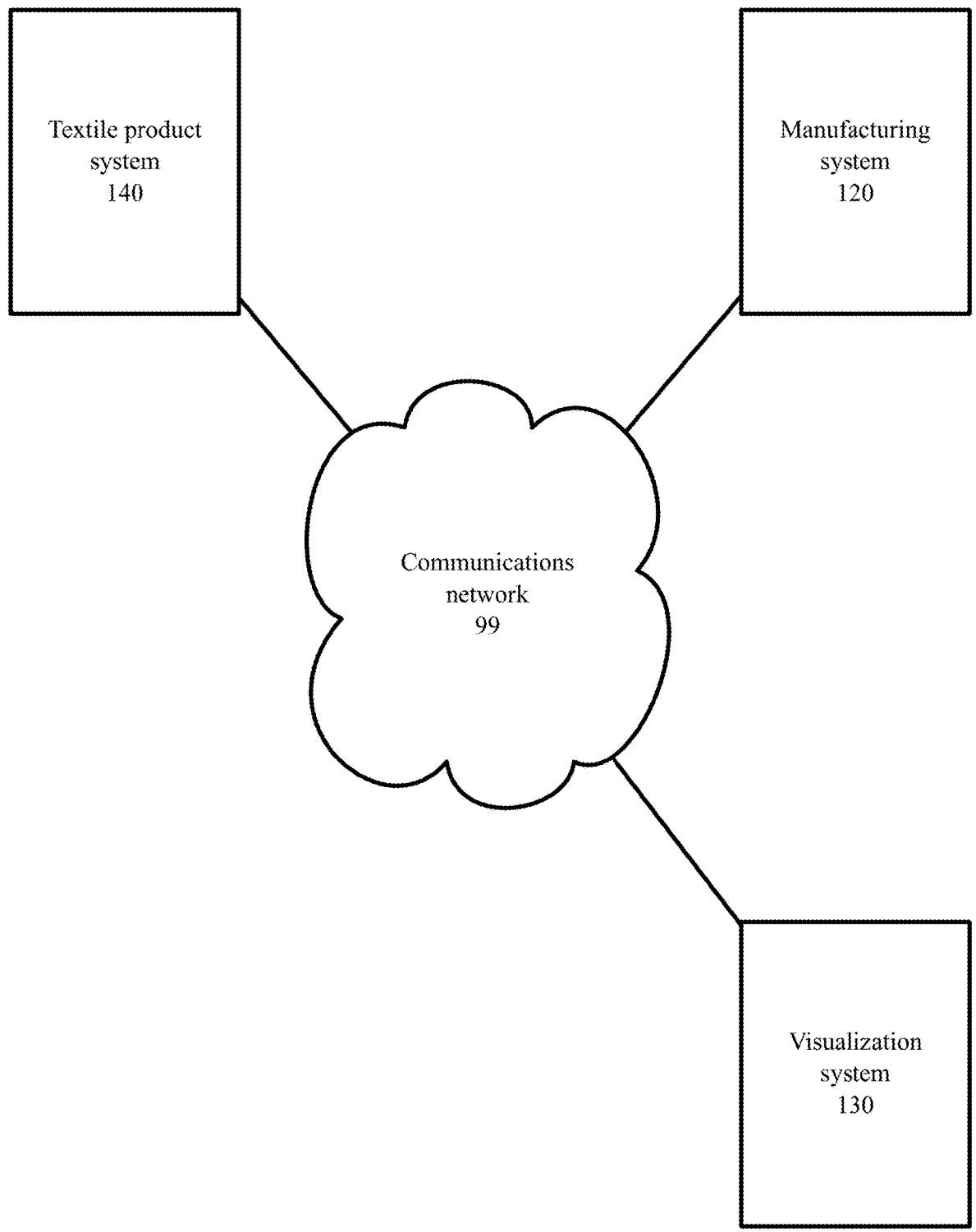
FIG. 1 is a block diagram depicting an operating environment to prepare textile products, in accordance with certain examples.

FIG. 1 is a block diagram depicting an example operating environment 100 in accordance with certain examples of the technology disclosed herein. While each server, system, and device shown in the operating environment is represented by one instance of the server, system, or device, multiple instances of each can be used. Further, while certain aspects of operation of the present technology are presented in examples related to FIG. 1 to facilitate enablement of the claimed invention, additional features of the present technology, also facilitating enablement of the claimed invention, are disclosed elsewhere herein.

As depicted in FIG. 1, the example operating environment 100 includes computing devices 110, 120, and 130. Each of devices 110, 120, and 130, may be configured to communicate with one another via communications network 99. In some examples, a user associated with a device must install an application and/or make a feature selection to obtain the benefits of the technology described herein.

Network 99 includes one or more wired or wireless telecommunications means by which network devices may exchange data. For example, the network 99 may include one or more of a local area network (LAN), a wide area network (WAN), an intranet, an Internet, a storage area network (SAN), a personal area network (PAN), a metropolitan area network (MAN), a wireless local area network (WLAN), a virtual private network (VPN), a cellular or other mobile communication network, a BLUETOOTH® wireless technology connection, a near field communication (NFC) connection, any combination thereof, and any other appropriate architecture or system, that facilitates the RF communication of signals, data, and/or messages. Throughout the discussion of examples, it should be understood that the terms "data" and "information" are used interchangeably herein to refer to text, images, audio, video, or any other form of information that can exist in a computer-based environment.

Each computing device 110, 120, and 130 can include a communication module capable of transmitting and receiving data over the network 99. For example, each network device can include a server, a desktop computer, a laptop computer, a tablet computer, a television with one or more processors embedded therein and/or coupled thereto, a smart phone, a handheld computer, a personal digital assistant (PDA), or any other wired or wireless processor-driven device.

In examples described herein, computing device 110 is a textile product system 110 operative to practice examples of the technology disclosed herein. In some examples, the textile product system 110 is used to create a common model of a textile product that can drive production of a both physical products via a manufacturing system 120 and a visualization system 130, in part by employing a driver layer that distills the common model into one or more destination-specific models.

The connections illustrated are examples, and other means of establishing a communications link between the computers and devices can be used. Moreover, those having ordinary skill in the art having the benefit of the present disclosure will appreciate that the computing devices illustrated in FIG. 1 may have any of several other suitable computer system configurations. For example, computing device 110 may be embodied as a system and may not include all the components described above.

Figure 7:
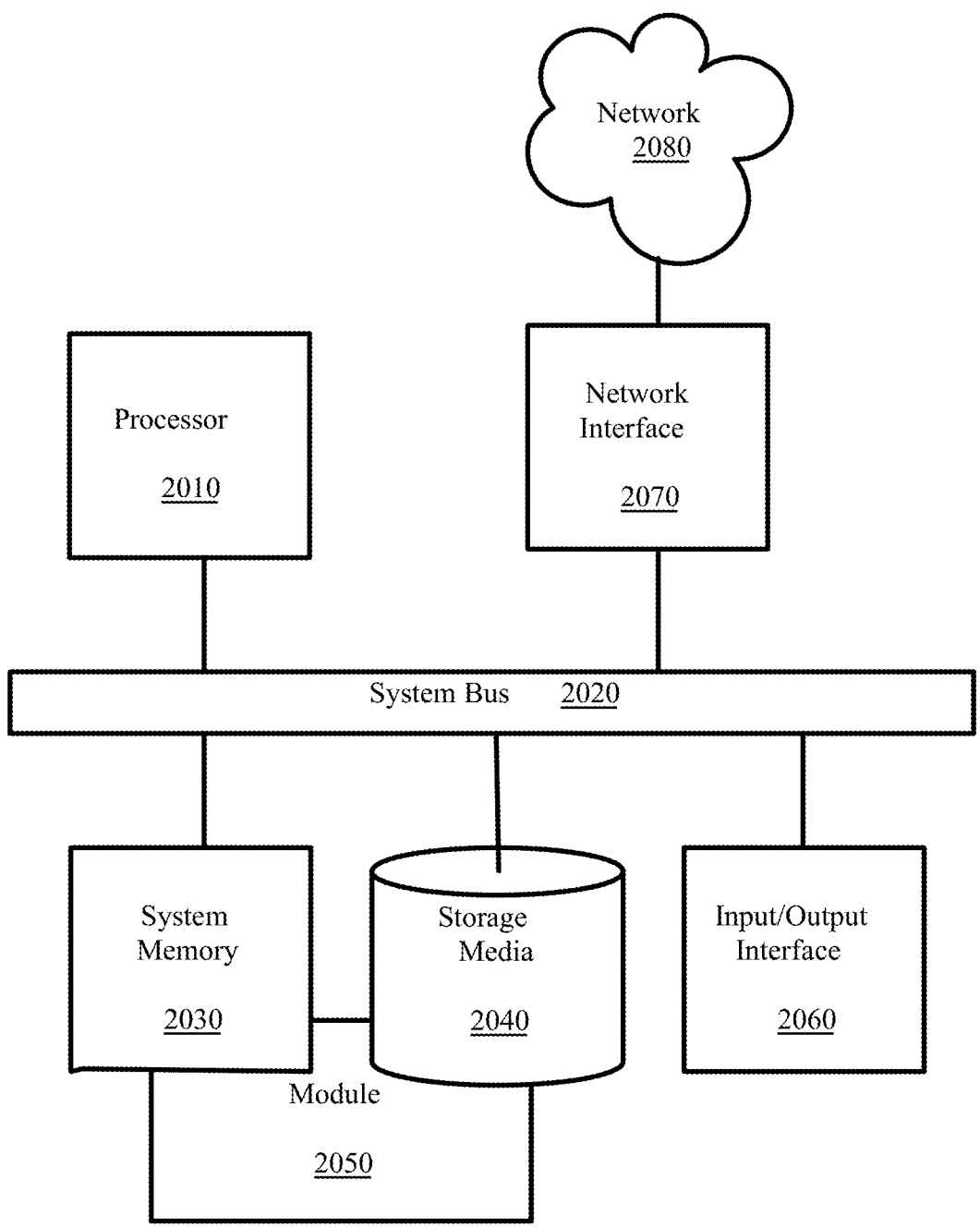
FIG. 7 is a block diagram depicting a computing machine and a module, in accordance with certain examples.

In examples, the computing devices, and any other computing machines associated with the technology presented herein, may be any type of computing machine such as, but not limited to, those discussed in more detail with respect to FIG. 7. Furthermore, any modules associated with any of these computing machines, such as modules described herein or any other modules (scripts, web content, software, firmware, or hardware) associated with the technology presented herein may be any of the modules discussed in more detail with respect to FIG. 7. The computing machines discussed herein may communicate with one another as well as other computer machines or communication systems over one or more networks, such as network 99. The network 99 may include any type of data or communications network, including any of the network technology discussed with respect to FIG. 7.

Example Processes

The example methods illustrated in the figures are described hereinafter with respect to the components of the example operating environment 100. The example methods also can be performed with other systems and in other environments. The operations described with respect to any of the figures can be implemented as executable code stored on a computer or machine readable non-transitory tangible storage medium (e.g., floppy disk, hard disk, ROM, EEPROM, nonvolatile RAM, CD-ROM, etc.) that are completed based on execution of the code by a processor circuit implemented using one or more integrated circuits; the operations described herein also can be implemented as executable logic that is encoded in one or more non-transitory tangible media for execution (e.g., programmable logic arrays or devices, field programmable gate arrays, programmable array logic, application specific integrated circuits, etc.).

Referring to FIG. 2, and continuing to refer to FIG. 1 for context, methods 200 to prepare textile products are illustrated in accordance with certain examples. In such methods 200, one or more computing devices of a textile product system 110, establishes data types, valid values for each data type, and valid relationships between the data types encompassing specification of textile products for manufacturing and visualization of the textile products—Block 210. As a continuing example, consider TABLE 1 as an extract from a specification of data types, valid values for each data type and valid relationships between the data types.

Note that "Notions and Trims' or "hardware" are also sometimes used in place of "Asset." Alternate Asset descriptors can include manufacturer and stock keeping unit (SKU) number. In some embodiments, Build of Materials is included in the file format. While TABLE 1 does not include a specific Fold, in some embodiments, Folds are referenced by a operation, for example, hem is a cut, a fold (with direction across a line), and then a sew operation.

Figure 3:
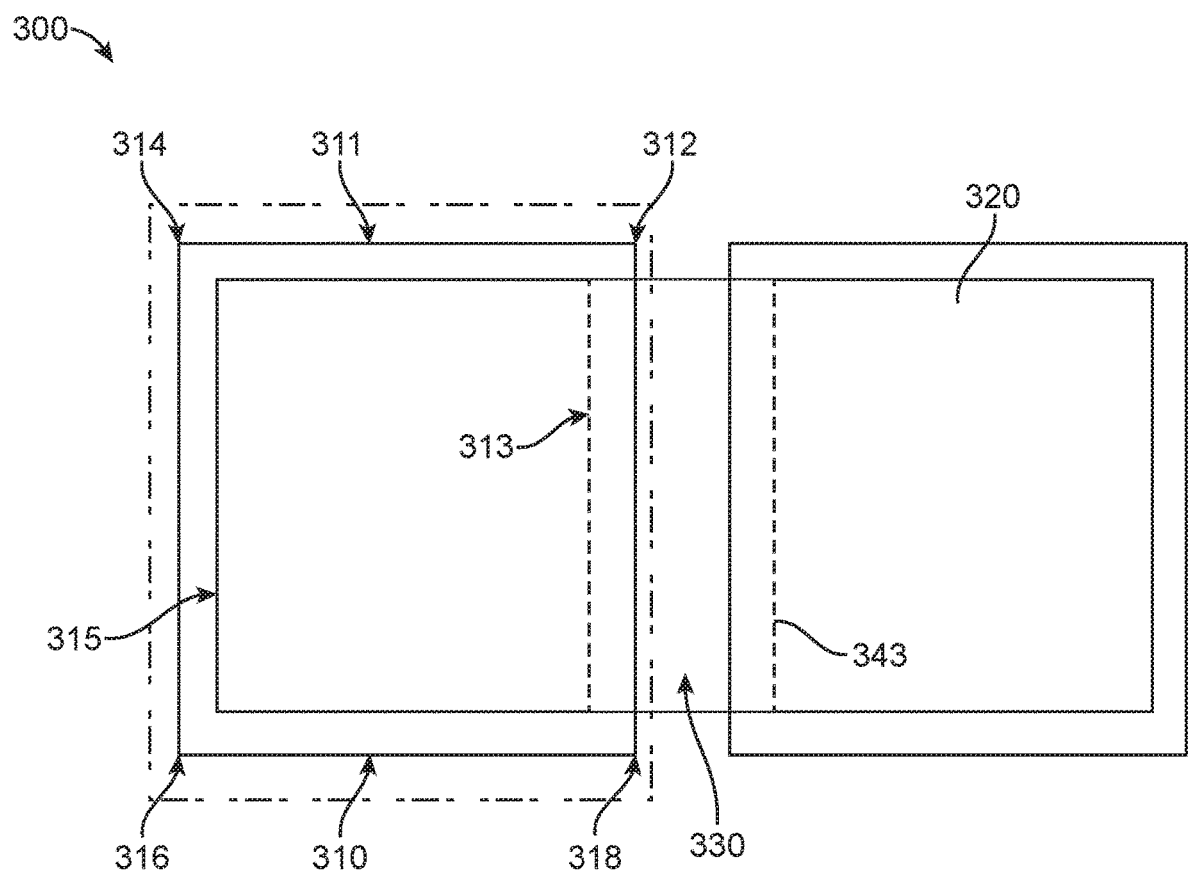
FIG. 3 is a block diagram illustrating panels and conventions used to prepare textile products, in accordance with certain examples.

In the model extract of the continuing example, aspects of the textile product such as Panels, Lines, Cuts, SewLines, Folds, Seams, Operations, and Points are defined, as well as data types (for example, "ThreadWeight," "Serged") as they related to the aspects, valid values for certain data types (for example, <selection from discrete list> for "RenderMaterialProperties," {T/F} for "Biased"), and relationships between the data types (for example "Edge1" is "<alphanumeric from Lines specification>," a Cut is characterized by one or more Lines while each Line is characterized by a plurality of points).

the line, "Line_0" 311 forming the boundary of "Panel_0" 310. As shown in TABLE 2, "Line_0" 311 includes the points defined by point index entries 0 (that is, {"x": 29.822173094842523, "y": −2.6573885385878326}), 1, 2, 3, with return to the point defined by point index entry 0. Each segment is defined as a straight line, that is, "Curve" is "false." In FIG. 3, Line_0 311 can be seen to form the approximate rectangle counterclockwise from "Point_0" 312, to "Point_1" 314, to "Point_2" 316, to "Point_3" 318, and back to "Point_0" 312. Notice that "Panel_0" 310 is not an ideal rectangle.

As an example of the relationship between two instances of a single data type, consider SewLine "Sew_0", which joins Lines "Line_1" 313 and "Line_4" 343 with thread of "ThreadWeight"=75, "ThreadWeightStandard"="metric",

TABLE 1

{"Panels": [{"ID": "<alphanumeric>", "RenderMaterialProperties": "<selection from discrete list>", "PhysicalMaterialProperties": "<selection from discrete list>", "SimulationPlacement": "Cylinder axis : product y axis", "PanelType": "<selection from discrete list>", "Tag": <T/F>, "Elastic": <T/F>}, ...]
"Lines": [{"ID": "<alphanumeric>", "PointIndices": <{integer from among Points specification}>, "Curve": <T/F>, "PanelID": "<Panel ID from Panels specification>" }, ...]
"Cuts": [{"ID": "...", "Lines": ["<alphanumeric from Lines specification >" ] }, ...]
"SewLines": [{"ID": "<alphanumeric>", "Lines": ["<alphanumeric from Lines specification>", ...], "ThreadWeight": <number>, "ThreadWeightStandard": "<selection from discrete list>", "PantoneColor": "<selection from discrete list>", "ThreadManufactuer": "<selection from discrete list>", "ThreadConstruction": "<selection from discrete list>", "ThreadContent": "<selection from discrete list>", "StitchType": "<selection from discrete list>", "StitchMeta": <selection from discrete list>}, "OffsetMM": <number>, "NeedleType": "<selection from discrete list>", "NeedleSizeStandard": "<selection from discrete list>", "NeedleSize": <selection from discrete list> }],
"Folds": [ ],
"Assets":[{"ID": ""<alphanumeric>", "Asset_type": "<selection from discrete list>", "Placement": "<Point from Points specification>," "Attachment_means": "<selection from discrete list>"}],
"Seams": [{"ID": "<alphanumeric>", "Edge1": "<alphanumeric from Lines specification>", "Edge2": "<alphanumeric from Lines specification>", "Biased": {T/F}, "Serged": {T/F}, "WaterproofSeamTape": {T/F}, "TapeWidthMM": <numeric>, "ReverseFirstSeam": {T/F}],
"Operations": [{"Type": "<selection from discrete list>": , "OrderHint": 0, "TargetID": "<ID from Cut or Sew specification>" }, ...]
"Points": [{"x": <number in >, "y": <number>}, ...]}

The textile product system 110 receives, from a user, a first data set comprising values of data types and relationships between the data types associated with at least one of manufacturing of a particular textile product and visualization of the particular textile product—Block 220. In the continuing example, and referring to FIG. 3 while continuing to refer to prior figures for context, consider the textile product 300 including two simple panels ("Panel_0" 310, "Panel_1" 320) being cut and stitched together along one seam ("Seam_0" 330). A specification, per the form of TABLE 1, for textile product 300 is given in TABLE 2.

As an example of how the textile product specification of TABLE 2 corresponds to the textile product 300, consider "PantoneColor"="P1-1U", "ThreadManufactuer"=unspecified, "ThreadConstruction"="Multifilament", "ThreadContent"="cotton", "StitchType"="straight", "StitchMeta"={"SPI": 7}, "OffsetMM"=0, "NeedleType"="regular", "NeedleSizeStandard":="American", and "NeedleSize"=10}.

Further, the model defines two "Cut" operations, one to cut out "Panel_0" 310 along "Line_0" 311, and one to cut out "Panel_1" 320 along "Line_1" 313 further specifying relationships among instance of the defined data types.

TABLE 2

{"Panels": [{"ID": "Panel_0", "RenderMaterialProperties": "white cotton", "PhysicalMaterialProperties": "cotton", "SimulationPlacement": "", "PanelType": "cloth", "Tag": false, "Elastic": false}, {"ID": "Panel_1", "RenderMaterialProperties": "white cotton", "PhysicalMaterialProperties": "cotton", "SimulationPlacement": "", "PanelType": "cloth", "Tag": false, "Elastic": false}],
"Lines": [{"ID": "Line_0", "PointIndices": [0, 1, 2, 3, 0 ], "Curve": false, "PanelID" "Panel_0" }, {"ID": "Line_1", "PointIndices": [4, 5], "Curve": false, "PanelID": "Panel_0"},
{"ID": "Line_2", "PointIndices": [6, 7, 8, 9], "Curve": false, "PanelID": "Panel_0"}, {"ID":

TABLE 2-continued

"Line_3", "PointIndices": [10, 13, 12, 11, 10], "Curve": false, "PanelID": "Panel_1"},
{"ID":
"Line_4", "PointIndices": [15, 14], "Curve": false, "PanelID": "Panel_1"}, {"ID": "Line_5",
"PointIndices": [19, 18, 17, 16], "Curve": false, "PanelID": "Panel_1"}],
"Cuts": [{"ID": "Cut_0", "Lines": ["Line_0"] }, {"ID": "Cut_1", "Lines": ["Line_3"]}],
"SewLines": [ {"ID": "Sew_0", "Lines": ["Line_1", "Line_4"], "ThreadWeight": 75,
"ThreadWeightStandard": "metric", "PantoneColor": "P 1-1 U", "ThreadManufactuer": "",
"ThreadConstruction": "Multifilament", "ThreadContent": "cotton", "StitchType": "straight",
"StitchMeta": {"SPI": 7}, "OffsetMM": 0, "NeedleType": "regular", "NeedleSizeStandard":
"American", "NeedleSize": <unspecified> }],
"Folds": [ ],
"Seams": [{"ID": "Seam_0", "Edge1": "Line_1", "Edge2": "Line_4", "Biased": false,
"Serged": false, "WaterproofSeamTape": false, "TapeWidthMM": 0, ReverseFirstSeam":
true}],
"Operations": [{"Type": "cut", "OrderHint": 0, "TargetID": "Cut_0" }, {"Type": "cut",
"OrderHint": 0, "TargetID": "Cut_1" }, {"Type": "sew", "OrderHint": 0, "TargetID":
"Sew_0" }],
"Points": [ {"x": 29.822173094842523, "y": -2.6573885385878326}, {"x":
0.2677631378173828, "y": -2.582348823547363}, {"x": 0.2677631378173828, "y":
30.56327438354492}, {"x": 29.73053932189941, "y": 30.41596221923828}, {"x":
26.89234924316406, "y": 0.2364006042480469}, {"x": 26.89234924316406, "y":
28.15306663513183}, {"x": 26.89234924316406, "y": 28.15306663513183}, {"x":
2.72568130493164, "y": 28.15306663513183}, {"x": 2.72568130493164, "y":
0.2364006042480469}, {"x": 26.89234924316406, "y": 0.2364006042480469}, {"x":
35.822173094842526, "y": -2.6573885385878326}, {"x": 65.37658305186767, "y":
-2.582348823547363}, {"x": 65.37658305186767, "y": 30.56327438354492},
{"x": 35.91380686778564, "y": 30.41596221923828}, {"x": 38.75199694652099, "y":
0.2364006042480469}, {"x": 38.75199694652099, "y": 28.15306663513183}, {"x":
38.75199694652099, "y": 28.15306663513183}, {"x": 62.91866488475341, "y":
28.15306663513183}, {"x": 62.91866488475341, "y": 0.2364006042480469}, {"x":
38.75199694652099, "y": 0.2364006042480469}]}

The textile product system 110 determines whether the received first data set conforms to the data type, data value, and data relationships valid for at least one of the manufacturing of textile products and the visualization of textile products—Block 230. In the continuing example, determining whether the received first data set conforms to the data type, data value, and data relationships valid for at least one of the manufacturing of textile products and the visualization of textile products includes determining whether any panel exceeds a maximum panel size (for example, is any panel larger than a bolt of cloth). Where at least one panel is determined to exceed the maximum panel size, some embodiment of the disclosed technology will scale all elements to conform, or reject the input (and optionally seek additional input from the user. In some embodiments, the textile product system 110 checks for missing cut operations within the file; missing sew operations within the file, missing seam definitions within the file. In the continuing example, the textile product system checks for missing information in each definitions, such as a sew line without thread information: "SewLines": [{"ID": "Sew_0", "Lines": ["Line_1", "Line_4" ],], panels that are not enclosed by cut lines, and overlapping cut lines.

Referring to FIG. 4, and continuing to refer to prior figures for context, methods 400 to prepare textile products are illustrated, in accordance with certain examples. In such examples, the textile product system 110 determines that the received first data set does not conform to at least the data types, valid data type values, and valid relationships between data types established for at least one of the manufacturing and the visualization of textile products. In response to this determination the textile product system requests at least one of additional and revised data and relationships between data types—Block 440. In the continuing example, the textile product system 110 determined that "NeedleSize" was unspecified. In response to determining that "NeedleSize" was unspecified, the textile product system 110 requested that the user provide a "NeedleSize" input. The textile product system 110 received "10" as the "NeedleSize" input from the user.

Referring to FIG. 5, and continuing to refer to prior figures for context, methods 500 to prepare textile products are illustrated, in accordance with certain examples. In such examples, the textile product system 110 receives, from the user, an identifier of a manufacturing system as a destination for a specification describing the particular textile product—Block 540.

In the continuing example, the textile product system 110 receives an identification of the manufacturing system 120, a manufacturing system including a CNC cutter that responds to G-code commands. "G-code," also known as RS-274, is the common name for the most widely used numerical control (NC) programming language. G-code can be used to prepare instructions provided to a machine controller that controls the motors of the manufacturing system.

The textile product system 110, in response to receiving an indication of manufacturing system 120 from the user, prepares, using a manufacturing system driver of the textile product system 110, instructions specific to the identified manufacturing system based on the received first data set—Block 550. In the continuing example, the textile product system 110 prepares instructions for manufacturing system 120, including CNC cutter tool paths based on the validated first data set for the textile product. For example, the textile product system 110 reads all "Points" in the validated first data set, and then identifies a length of textile that will encompass the entirety of the textile product.

Then looking at each operation, the textile product system 110 converts the "Cuts" into a tool path for the CNC cutter of the manufacturing system 120. In addition, the textile product system 110 converts "SewLines" from the file into tool paths for the sewing stations after the CNC cutter has cut the panels. The textile product system prepares instructions for robots or other actuators to move the in-process textile product between stations. TABLE 3 presents an example cut instruction stream in G-code for "Panel_0" 310 of the textile product modeled in Table 2.

TABLE 3

```
G21 ; Set to Millimeters
G00 X2.677 Y305.63 Z50 ; Move to a corner. Raise knife.
G04 P100 ; Pause for 100 milliseconds
G00 Z0 ; Plunge knife
G01 X 297.30 Y305.63 X297.30 Y2.36 X2.677 2.36 X2.677
Y305.63 ; finish cut back at start
G00 Z0 ; raise knife
```

In the continuing example, the instructions include instructions to move the newly cut panel next to the "Panel_1" 320 (after "Panel_1" is also cut in the same fashion) and brought to the sewing station. The instructions include instructions for a manipulator of the manufacturing system 120 that uses computer vision and a simple actuator to move cloth across a flat low-friction surface by dragging. In the continuing example, the manufacturing driver of the textile product system 110 produces the code of TABLE 4 as an instruction stream for moving the panel to a sewing station of the manufacturing system.

TABLE 4

```
DetectShapeWithOutline( [0, 303], [295, 303], [295,0], [0,0]] )
SetOriginToMinimums( );
ChooseTool("Flat actuator");
MoveTo( 150.0, 150.0)
ToolDown( )
ToolActivate( )
TranslateToStoredLocation("Sew Station")
ToolUp( )
ResetToStart( )
```

The manufacturing driver of the textile product system 110 generates a similar instruction stream for the "Panel_1" 320, that brings "Panel_1" 320 into position near the sewing machine and the edges "Line_1" 313 and "Line_4" 343 match.

For the sewing station of manufacturing system 120, the manufacturing driver of the textile product system 110 parses the needle, thread color, etc. TABLE 5 presents an instruction stream for sewing "Panel_0" 310 and "Panel_1" 320 together, and moving the product to a sewing output hopper of the manufacturing system 120.

The textile product system 110 transmits the prepared instructions to the identified manufacturing system—Block 550. In the continuing example, textile product system 110 transmits the prepared instructions to the identified manufacturing system 120.

TABLE 5

```
SelectThreadSpool("White", "Multifilament")
SelectNeedle(Standard, 10)
SelectStitchesPerInch(7)
StartSewing( )
FootDown( )
FeedLength( 303, "millimeters")
FootUp( )
EndSewingAndCut( )
DetectShapeWithOutline( [0, 303], [600, 303], [600,0], [0,0]] )
SetOriginToMinimums( );
ChooseTool("Flat actuator");
MoveTo( 303.0, 150.0 )
ToolDown( )
```

TABLE 5-continued

```
ToolActivate( )
TranslateToStoredLocation("Output Hopper")
ToolUp( )
Reset( )
```

The textile product system 110 transmits the prepared instructions to the identified manufacturing system—Block 550. In the continuing example, textile product system 110 transmits the prepared instructions to the identified manufacturing system 120.

Referring to FIG. 6, and continuing to refer to prior figures for context, methods 600 to prepare textile products are illustrated, in accordance with certain examples. In such examples, the textile product system 110 receives, from the user, an identifier of a visualization system as a destination for a specification describing the particular textile product—Block 640. In the continuing example, the textile product system 110 receives, from the user, an identifier of a visualization system 130 as a destination for a specification describing the particular textile product.

The textile product system 110 prepares, using a visualization system driver, instructions specific to the identified visualization system 130 based on the received first data set—Block 650. In the continuing example, the textile product system 110 prepares instructions for simulation system 130 based on the validated first data set for the textile product. For example, the textile product system 110 visualization driver reads the "Cuts," and creates outer boundaries of each panel. The "SewLines" and "Seams" from the file are read to determine where the two panels are brought together. The two panels are meshed, that is, a set of points is generated within the bounds of each cloth panel.

The textile product system 110 transmits the prepared instructions to the identified visualization system—Block 650. In the continuing example, textile product system 110 transmits the prepared instructions to the identified manufacturing system 120.

In some embodiments of the disclosed technology, the visualization driver of the visualization system 130 prepares instructions that include data referencing the particular textile product to at least one point of a reference object, for example, a human model's elbow (for a shirt sleeve), a table top including orientation (for a tablecloth), a wheel (for a tire cover). In some embodiments, the identified visualization system presents to the user, a visualization of the particular textile product based on the prepare instructions.

Other Examples

FIG. 7 depicts a computing machine 2000 and a module 2050 in accordance with certain examples. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a router or other network node, a vehicular information system, one or more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain examples, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to certain examples, any of the processor 2010, the other elements of the computing machine 2000, or the various peripherals discussed herein may be integrated into a single device such as a system on chip ("SOC"), system on package ("SOP"), or ASIC device.

The present technology may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the present technology in computer programming, and the examples should not be construed as limited to any one set of computer program instructions. Further, a skilled programmer would be able to write such a computer program to implement the present technology as described herein based on the appended flow charts and associated description in the application text. Therefore, disclosure of a particular set of program code instructions is not considered necessary for an adequate understanding of how to make and use the technology described herein. Further, those skilled in the art will appreciate that one or more aspects of the technology described herein may be performed by hardware, software, or a combination thereof, as may be embodied in one or more computing systems. Moreover, any reference to an act being performed by a computer should not be construed as being performed by a single computer as more than one computer may perform the act.

The technology described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the examples presented previously are illustrative, and, in alternative examples, certain acts can be performed in a different order, in parallel with one another, omitted entirely, and/or combined between different examples, and/or certain additional acts can be performed, without departing from the scope and spirit of various examples. Accordingly, such alternative examples are included in the scope of the following claims, which are to be accorded the broadest interpretation to encompass such alternate examples. For example, an input such as Although specific examples have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the examples, in addition to those described above, can be made by a person of ordinary skill in the art, having the benefit of the present disclosure, without departing from the spirit and scope of technology described herein defined in the following claims, the scope of which is to be accorded the broadest interpretation so as to encompass such modifications and equivalent structures.

What is claimed is:

1. A computer-implemented method to prepare textile products, comprising:

establishing, by one or more computing devices of a textile product system, a textile product specification comprising data types, valid values for each data type, and valid relationships between the data types encompassing specification of textile products for manufacturing and visualization of the textile products, wherein the textile product specification defines relationships between instances of one or more data types associated with at least one of manufacturing of the textile products and visualization of the textile products;

receiving, by the one or more computing devices from a user, a first data set comprising values of the data types and relationships between the data types associated with at least one of manufacturing of a particular textile product and visualization of the particular textile product;

determining, by an isolation layer of the one or more computing devices, that the first data set conforms to the textile product specification comprising the relationships between instances of the one or more data types associated with at least one of the manufacturing of textile products and the visualization of textile products;

in response to determining, by the isolation layer of the one or more computing devices, that the first data set conforms to the textile product specification comprising the relationships between instances of the one or more data types associated with at least one of the manufacturing of textile products and the visualization of textile products:

providing, by the one or more computing devices, the first data set to a manufacturing system driver layer of the one or more computing devices;

preparing, by the manufacturing system driver layer of the one or more computing devices, instructions specific to a manufacturing system associated with the manufacturing system driver layer based on the first data set, wherein the instructions specific to the manufacturing system include computer numerical control (CNC) instructions; and transmitting, by the manufacturing system driver layer of the one or more computing devices, the instructions to the manufacturing system;

determining, by the isolation layer of the one or more computing devices, that a second data set does not conform to the textile product specification comprising the relationships between instances of the one or more data types associated with at least one of the manufacturing of textile products and the visualization of textile products; and in response to determining, by the isolation layer of the one or more computing devices, that the second data set does not conform to the textile product specification, requesting, by the isolation layer of the one or more computing devices, at least one of additional and revised data and relationships between data types.

2. The method of claim 1, further comprising:
receiving, by the one or more computing devices from the user, an identifier of the manufacturing system as a destination for the particular textile product.

3. The method of claim 1, further comprising:
receiving, by the one or more computing devices from the user, an identifier of a visualization system as a destination for the particular textile product;
preparing, by a visualization system driver layer of the one or more computing devices, instructions specific to the identified visualization system based on the first data set; and
transmitting, by the visualization system driver layer of the one or more computing devices, the instructions to the visualization system.

4. The method of claim 3, wherein the instructions specific to the visualization system include data referencing the particular textile product to at least one point of a reference object.

5. The method of claim 3, further comprising, presenting, by the visualization system to the user, a visualization of the particular textile product based on the instructions.

6. A computer program product, comprising:
a non-transitory computer-readable storage device having computer-executable program instructions embodied thereon that when executed by a computer cause the computer to prepare textile products, the computer-executable program instructions comprising:
computer-executable program instructions to establish a textile product specification comprising data types, valid values for each data type, and valid relationships between the data types encompassing specification of textile products for manufacturing and visualization of textile products, wherein the textile product specification defines relationships between instances of one or more data types associated with at least one of manufacturing of the textile products and visualization of the textile products;
computer-executable program instructions to receive, from a user, a first data set comprising values of the data types and relationships between the data types associated with at least one of manufacturing of a particular textile product and visualization of the particular textile product;
computer-executable program instructions to determine, at an isolation layer of the computer, that the first data set conforms to the textile product specification comprising the relationships between instances of the one or more data types associated with the manufacturing of textile products and the visualization of textile products;
computer-executable program instructions that, in response to determining, by the isolation layer of the computer, that the first data set conforms to the textile product specification comprising the relationships between instances of the one or more data types associated with at least one of the manufacturing of textile products and the visualization of textile products, providing the first data set to a manufacturing system driver layer of the computer;
computer-executable program instructions to prepare, at the manufacturing system driver layer of the computer, manufacturing instructions specific to a manufacturing system associated with the manufacturing system driver layer based on the first data set, wherein the instructions specific to the manufacturing system include computer numerical control (CNC) instructions;
computer-executable program instructions to transmit, by the manufacturing system driver layer of the computer, the manufacturing instructions to the manufacturing system;
computer-executable program instructions to determine, by the isolation layer of the computer, that a second data set does not conform to at least the textile product specification comprising the relationships between instances of the one or more data types associated with at least one of the manufacturing and the visualization of textile products; and
computer-executable program instructions that, in response to determining, by the isolation layer of the computer, that the second data set does not conform to the textile product specification comprising the relationships between instances of the one or more data types associated with at least one of the manufacturing of textile products and the visualization of textile products, request, by the isolation layer of the computer, at least one of additional and revised data and relationships between data types.

7. The computer program product of claim 6, further comprising computer-executable program instructions to:
receive, from the user, an identifier of the manufacturing system as a destination for the particular textile product.

8. The computer program product of claim 6, further comprising computer-executable program instructions to:
receive, from the user, an identifier of a visualization system as a destination for the particular textile product;
prepare visualization instructions specific to the identified visualization system based on the first data set; and
transmit the visualization instructions to the visualization system.

9. The computer program product of claim 8, wherein the visualization instructions include data referencing the particular textile product to at least one point of a reference object.

10. The computer program product of claim 8, further comprising computer-executable program instructions to present, by the visualization system and to the user, a visualization of the particular textile product based on the visualization instructions.

11. A system to prepare textile products, comprising:
a storage device; and
a processor communicatively coupled to the storage device, wherein the processor executes application code instructions that are stored in the storage device to cause the system to:
establish a textile product specification comprising data types, valid values for each data type, and valid relationships between the data types encompassing specification of textile products for manufacturing and visualization of textile products, wherein the textile product specification defines relationships between instances of one or more data types associated with at least one of manufacturing of the textile products and visualization of the textile products;

receive, from a user, a first data set comprising values of data types and relationships between the data types associated with at least one of manufacturing of a particular textile product and visualization of the particular textile product;

determine, at an isolation layer of the system, that the first data set conforms to the textile product specification comprising the relationships between instances of the one or more data types associated with the manufacturing of textile products and the visualization of textile products;

in response to determining, by the isolation layer of the system, that the first data set conforms to the textile product specification comprising the relationships between instances of the one or more data types associated with at least one of the manufacturing of textile products and the visualization of textile products, provide the first data set to a manufacturing system driver layer of the system;

prepare, at the manufacturing system driver layer of the system, manufacturing instructions specific to a manufacturing system associated with the manufacturing system driver layer based on the first data set, wherein the manufacturing instructions include computer numerical control (CNC) instructions; and transmit, by the manufacturing system driver layer of the system, the manufacturing instructions to the manufacturing system;

determine, at the isolation layer of the system, that a second data set does not conform to the textile product specification comprising relationships between instances of the one or more data types established for at least one of the manufacturing and the visualization of textile products; and in response to determining, by the isolation layer of the system, that the second data set does not conform to the textile product specification, request, by the isolation layer of the system, at least one of additional and revised data and relationships between data types.

12. The system of claim 11, further comprising instructions that are stored in the storage device to cause the system to:

determine, by the isolation layer of the system, that the first data set does not conform to at least the textile product specification comprising the relationships between instances of the one or more data types associated with at least one of the manufacturing and the visualization of textile products; and in response to determining, by the isolation layer of the computer, that the first data set does not conform to the textile product specification comprising the relationships between instances of the data types associated with at least one of the manufacturing of textile products and the visualization of textile products, request, by the isolation layer of the system, at least one of additional and revised data and relationships between data types.

13. The system of claim 11, further comprising instructions that are stored in the storage device to cause the system to:

receive, from the user, an identifier of the manufacturing system as a destination for the particular textile product.

14. The system of claim 11, further comprising instructions that are stored in the storage device to cause the system to:

receive, from the user, an identifier of a visualization system as a destination for the particular textile product;

prepare visualization instructions specific to the identified visualization system based on the first data set; and transmit the visualization instructions to the visualization system.

15. The system of claim 14, wherein the visualization instructions include data referencing the particular textile product to at least one point of a reference object.

* * * * *